United States Patent
Natanzon et al.

(10) Patent No.: US 10,203,904 B1
(45) Date of Patent: Feb. 12, 2019

(54) CONFIGURATION OF REPLICATION

(71) Applicant: EMC Corporation, Hopkinton, MA (US)

(72) Inventors: Assaf Natanzon, Tel Aviv (IL); Matan Gilat, Hadera (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 831 days.

(21) Appl. No.: 14/035,124

(22) Filed: Sep. 24, 2013

(51) Int. Cl.
 *G06F 3/00* (2006.01)
 *G06F 3/06* (2006.01)

(52) U.S. Cl.
 CPC .............. *G06F 3/065* (2013.01); *G06F 3/061* (2013.01); *G06F 3/067* (2013.01)

(58) Field of Classification Search
 CPC .......... G06F 3/065; G06F 3/061; G06F 3/067; G06F 3/0605; G06F 3/0641; G06F 3/0619; G06F 3/0689; G06F 3/0665; G06F 11/2071; G06F 11/2064; G06F 11/1076; G06F 11/2069
 See application file for complete search history.

(56) References Cited

U.S. PATENT DOCUMENTS

| | | | | |
|---|---|---|---|---|
| 5,778,395 A * | 7/1998 | Whiting | ............. | G06F 11/1464 |
| 6,157,991 A * | 12/2000 | Arnon | ................. | G06F 11/2064 711/161 |
| 6,898,685 B2 * | 5/2005 | Meiri | .................... | G06F 3/0614 700/82 |
| 7,178,055 B2 * | 2/2007 | Ji | ........................ | G06F 11/2069 711/162 |
| 7,516,287 B2 | 4/2009 | Ahal et al. | | |
| 7,617,262 B2 * | 11/2009 | Prahlad | ............. | G06F 17/30212 |
| 7,716,180 B2 * | 5/2010 | Vermeulen | ........ | G06F 17/30212 707/626 |
| 8,060,714 B1 * | 11/2011 | Natanzon | ................... | G06F 7/00 707/640 |
| 8,214,612 B1 * | 7/2012 | Natanzon | ............. | G06F 11/1612 707/622 |
| 8,332,687 B1 | 12/2012 | Natanzon et al. | | |
| 8,335,761 B1 * | 12/2012 | Natanzon | ............. | G06F 11/1471 707/626 |
| 8,335,771 B1 * | 12/2012 | Natanzon | .......... | G06F 17/30008 707/684 |
| 8,341,115 B1 | 12/2012 | Natanzon et al. | | |
| 8,725,691 B1 | 5/2014 | Natanzon et al. | | |
| 8,819,362 B1 * | 8/2014 | Duprey | ............... | G06F 11/2069 711/161 |
| 2006/0053181 A1 * | 3/2006 | Anand | ................. | G06F 11/0715 |
| 2006/0053334 A1 * | 3/2006 | Ingen | ................... | G06F 11/1466 714/2 |

(Continued)

*Primary Examiner* — Francisco A Grullon
(74) *Attorney, Agent, or Firm* — Krishnendu Gupta; Konrad R. Lee

(57) ABSTRACT

A computer implemented method, system, and computer program product for use in replication comprising calculating a set of signatures for each of a set of LUNs on a production site, calculating a set of signatures for each of a set of LUNs on a replication site, comparing the set of signatures to determine a mapping for the set of LUNs on the production site to the set of LUNs on the replication site, and matching a the set of LUNs on the production site to the set of LUNs on the replication site.

20 Claims, 11 Drawing Sheets

(56) References Cited

U.S. PATENT DOCUMENTS

| | | | |
|---|---|---|---|
| 2006/0136685 A1* | 6/2006 | Griv | G06F 11/2064 |
| | | | 711/162 |
| 2006/0161810 A1* | 7/2006 | Bao | G06F 11/2082 |
| | | | 714/6.12 |
| 2006/0212462 A1* | 9/2006 | Heller | G06F 3/0608 |
| 2007/0038824 A1* | 2/2007 | Suishu | G06F 11/2058 |
| | | | 711/162 |
| 2008/0082770 A1* | 4/2008 | Ahal | G06F 11/1471 |
| | | | 711/162 |
| 2009/0055593 A1* | 2/2009 | Satoyama | G06F 3/0608 |
| | | | 711/134 |
| 2012/0084519 A1* | 4/2012 | Vijayan | G06F 11/1453 |
| | | | 711/162 |
| 2012/0150826 A1* | 6/2012 | Vijayan Retnamma | |
| | | | G06F 17/30312 |
| | | | 707/692 |
| 2013/0262801 A1* | 10/2013 | Sancheti | G06F 3/065 |
| | | | 711/162 |
| 2014/0025641 A1* | 1/2014 | Kumarasamy | G06F 17/30309 |
| | | | 707/661 |
| 2016/0034481 A1* | 2/2016 | Kumarasamy | G06F 17/30088 |
| | | | 707/639 |

* cited by examiner

CONFIGURATION OF REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history.

Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, system, and computer program product for use in replication comprising calculating a set of signatures for each of a set of LUNs on a production site, calculating a set of signatures for each of a set of LUNs on a replication site, comparing the set of signatures to determine a mapping for the set of LUNs on the production site to the set of LUNs on the replication site, and matching a the set of LUNs on the production site to the set of LUNs on the replication site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
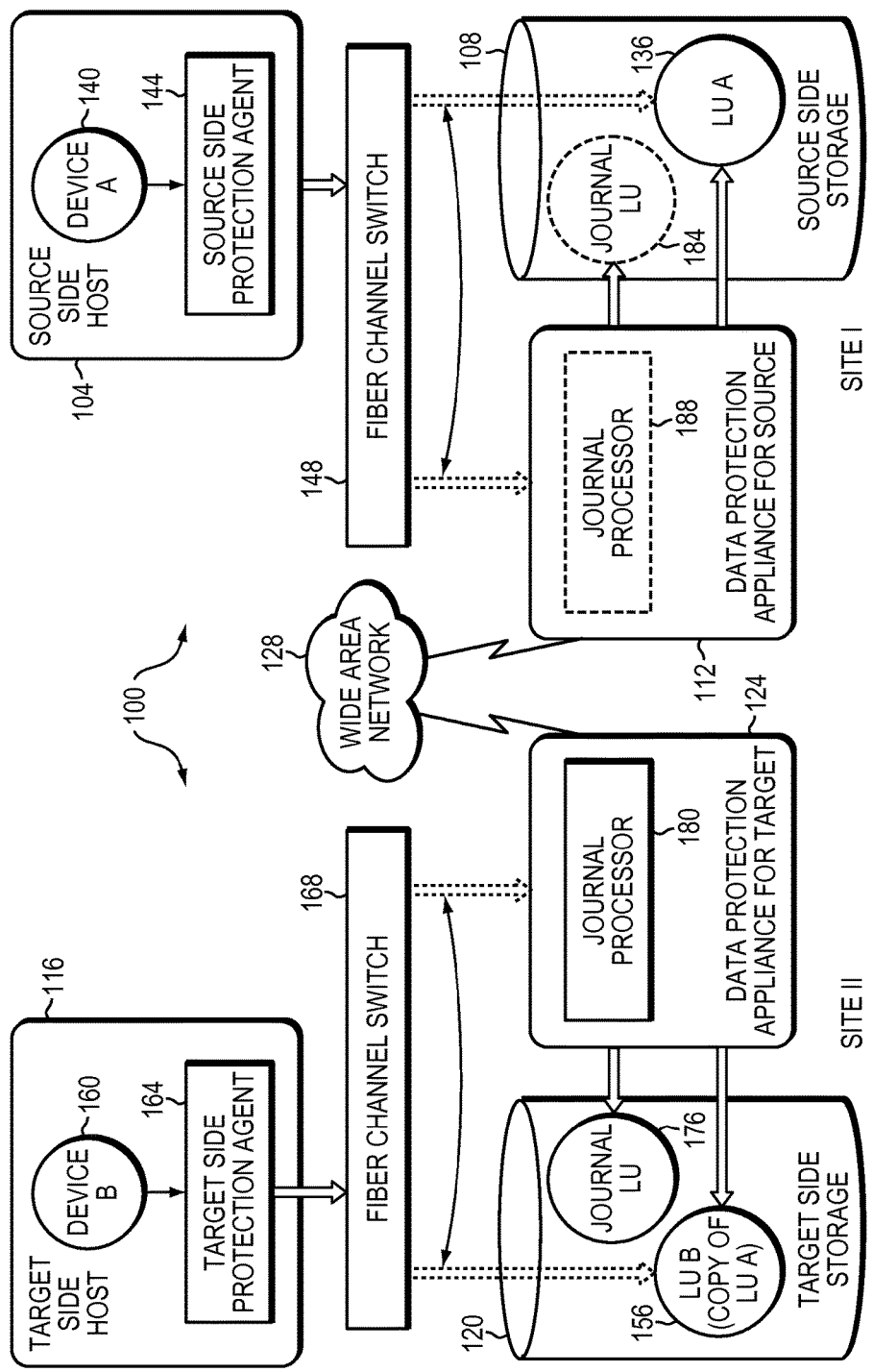
FIG. 1 is a simplified illustration of a data protection system, in accordance with an embodiment of the present disclosure.

Typically, replication volumes are matched to the production volumes, which they replicate. Conventionally, matching of the production volumes to the replication volumes may be problematic. Usually, if there are a large number of volumes, then a user must manually match the production volumes with each replication volume. Generally, if a mapping configuration has been lost, the user may not know which production volumes are mapped to which replication volumes. Typically, if a user desired to switch replication solutions, the mapping to production volumes to replication volumes may be lost. Usually, if replication volumes are preloaded with data corresponding to volumes on a production site, there may not be an automated way to map the production volumes to the replication volumes.

Usually, when production volumes to be replicated are large, the replication volumes may be initialized using a tape rather than WANs, in a such a case user may need to configure the replica for each volume in the replication product manually after the data is pre-loaded which may lead to errors. Generally, this may require the user to manually select the correct replica volume for each protected volumes. Conventionally, a matching problem may occur if a user deletes a consistency group configuration or configuration is lost due to configuration data corruption.

In some embodiments, the current disclosure may enable automatic assignment of replica volumes to production volumes. In certain embodiments, automatic matching of the volumes may occur by using an algorithm to create a set of signatures for a volume. In some embodiments, the signature may be a list of hash values for data ranges on a volume. In at least some embodiments, volumes may be matched to volumes that have the closest signatures (i.e. volumes which are the same at most locations).

In certain embodiments, for a set of volumes on a production site, a set of signatures for each volume on the production site may be calculated. In some embodiments, for a set of volumes on a replication site, a set of signatures may be calculated for each volume on the replication site. In other embodiments, the set of signatures for each volume on the production site may be compared to the set of signatures for each volume on the replication site. In further embodiments, an algorithm may be used to compare the sets of signatures on the replication site to the set of signatures on the production site to create a mapping of which volume on the production site is most similar to each volume on the replication site.

In particular embodiments, the user may configure the production volumes to be replicated in a consistency group (CG) and the system may automatically match the best fit replica volumes. In other embodiments, if similar volumes are not found the system may match any volume with similar size. In further embodiments, the sparseness of the volume (i.e. how many thin extents it has) may also be used as a criteria for matching. In still further embodiments, an algorithm considering one or more of the size of the volume, similarity of the signatures, and number of extents may be used to match replication volumes to production volumes. In still further embodiments, an algorithm may consider a set of characteristics to determine which replication volume may be matched with which production volume.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split 10 from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
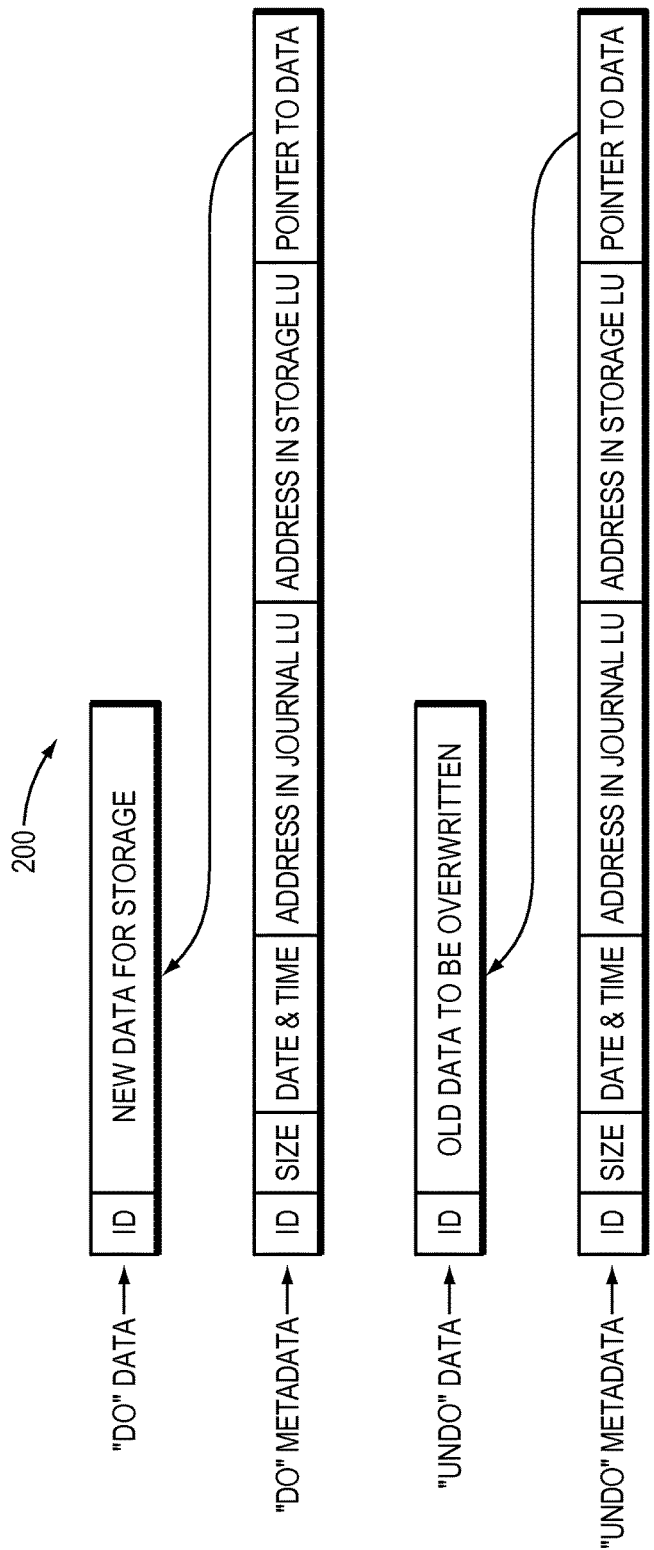
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction.

To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Replication Volume Matching

Figure 3:
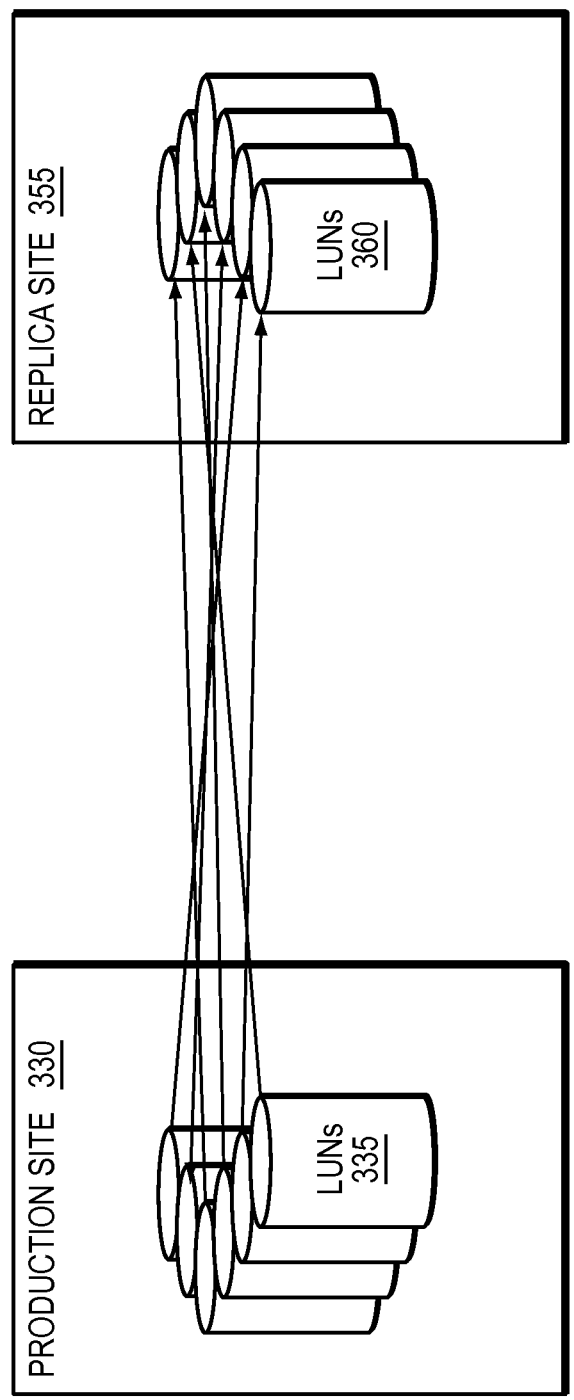
FIG. 3 is a simplified illustration of a data protection environment with a production site with LUNs that are mapped to LUNs on a replication site, in accordance with an embodiment of the present disclosure.

Refer now to the example embodiment of FIG. 3. In the example embodiment of FIG. 3, production site 330 has LUNs 335. Replication site 355 has LUNs 360. Production LUNs 335 are mapped to be replicated to LUNs 360 on replication site 355. In this embodiment, changes to the production volumes may be split and written to the replication LUN mapped to the production LUN.

Figure 4:
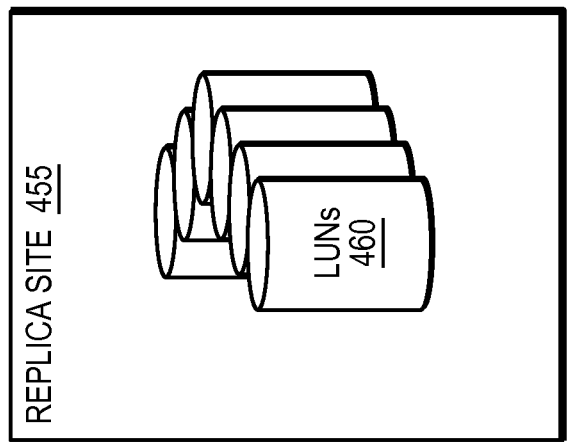
FIG. 4 is a simplified illustration of a data protection environment with a production site with LUNs that are not mapped to LUNs on a replication site, in accordance with an embodiment of the present disclosure.
Figure 4:
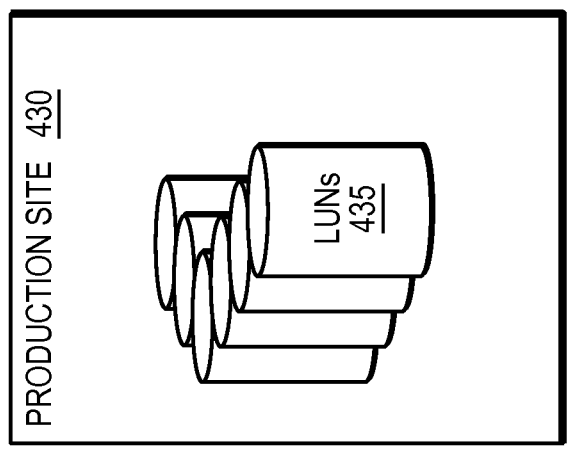

Refer now to the example embodiment of FIG. 4. In this embodiments production site 430 has LUNs 435 and replication site 455 has LUNs 460, however the LUNs are not mapped from the production site to the replication site. That is, the replication site does not have a mapping to know what IO directed to what production LUN should be applied to what replication LUN.

Figure 5:
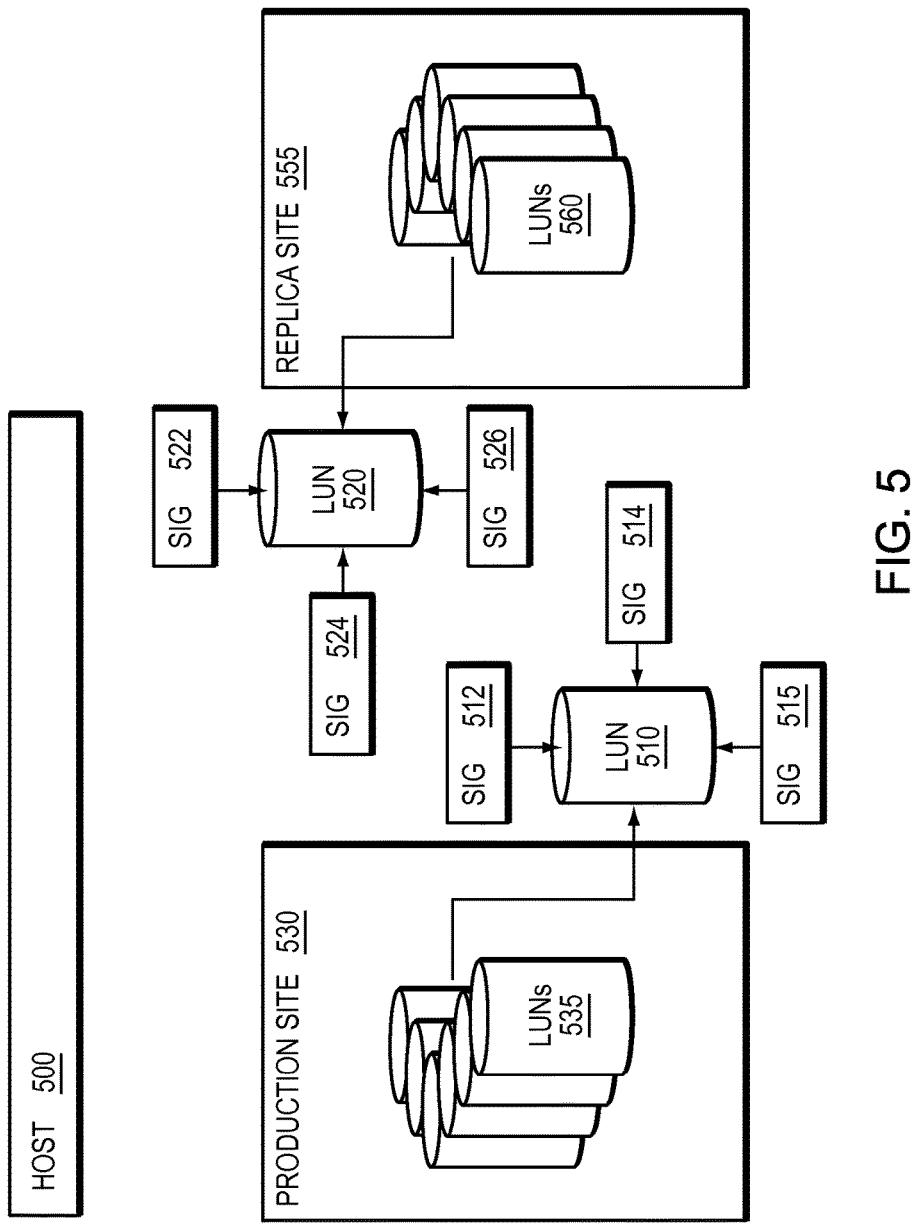
FIG. 5 is a simplified illustration of a taking hash values of production LUNs and replication LUNs in data protection environment with a production site with LUNs and a replication site with LUNs, in accordance with an embodiment of the present disclosure.
Figure 7:
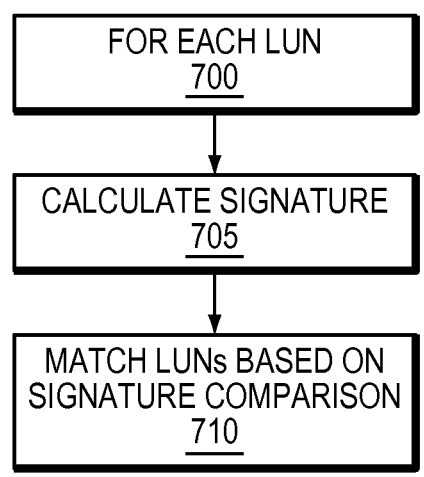
FIG. 7 is a simplified example of a method for matching similar LUNs using signatures of the LUN, in accordance with an embodiment of the present disclosure.

Refer now to the example embodiments of FIGS. 5 and 7. In these embodiments, for each LUN (step 700), a set of signatures is calculated (step 705). For LUN 510, signatures 512, 514, and 515 are calculated (step 705). As well, each of the LUNs 535 on production site 530 has a set of signatures calculated (step 705). On replication site 555, each of the LUNs 560, has a set of signatures calculated (step 705). For example, LUN 520 has signatures 522, 524, and 526 calculated (step 705). Match LUNs based on signature comparison (step 710).

In some embodiments, the signatures may be calculated for a set of pseudo random locations in the logical units, for instance the system may choose 100 offsets (the same offsets in each LU), read a constant amount of data from each locations (say 1 MB) and calculate a cryptographic hash function for the data read (say SHA1 hash, which is a cryptographic hash function designed by the United States National Security Agency and published by the United States NIST as a U.S. Federal Information Processing Standard.).

Figure 6:
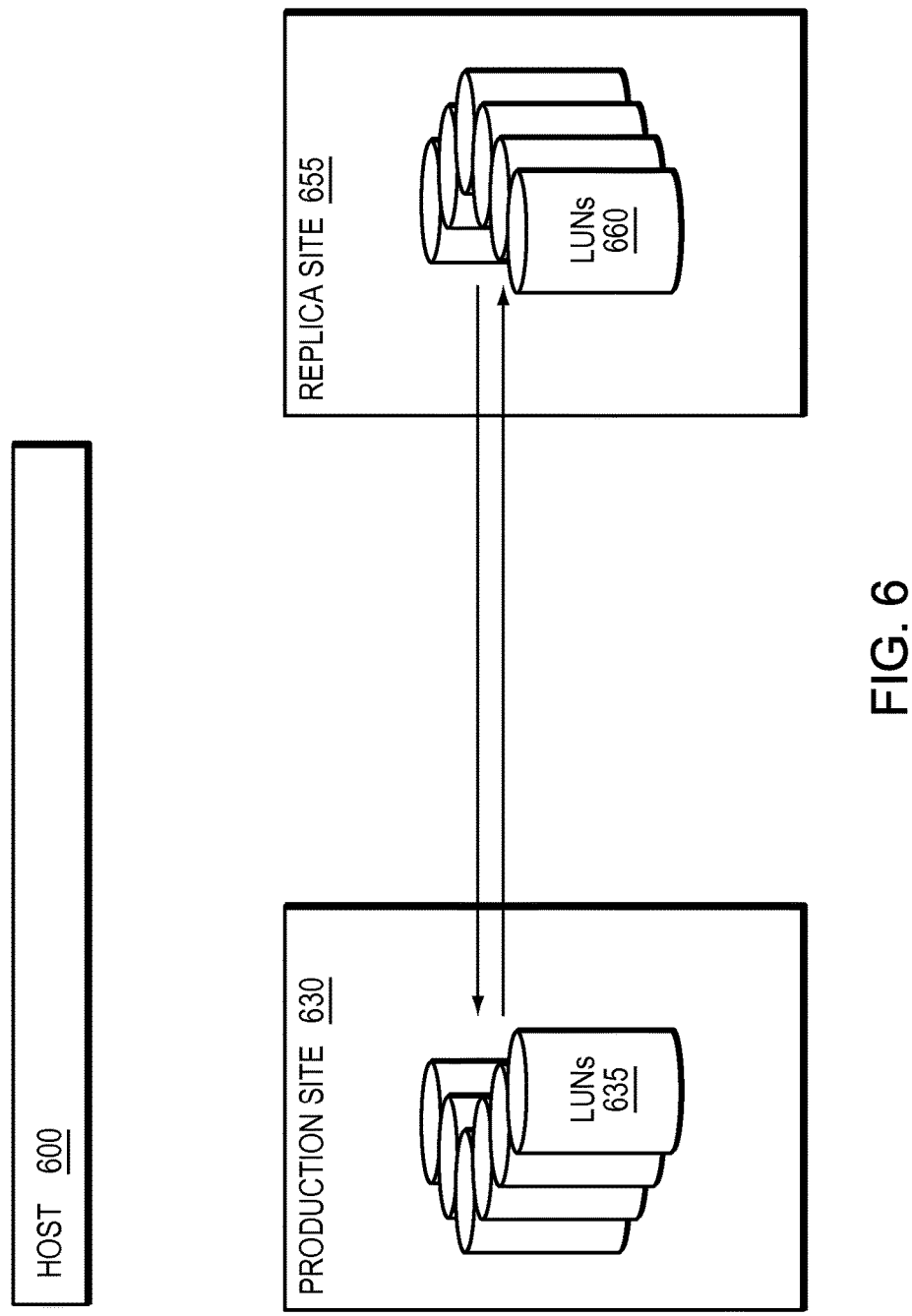
FIG. 6 is a simplified illustration of a data protection environment with a production site with LUNs that are being mapped to LUNs on a replication site, in accordance with an embodiment of the present disclosure.

Refer now as well to the example embodiment of FIG. 6. Based on the calculated signatures, LUNs 635 are compared to see how many signatures are similar between the production and replication LUNs. In this embodiment, the LUNs with the most similar signatures on the production site are mapped to LUNs 660 on the replication site with the most similar signatures based on a weighting algorithm. In some embodiments, the algorithm may include comparing the cryptographic hash values calculated and counting the number of cryptographic hashes matching between the two volumes, the more identical locations the more the LUN are similar. For example in some embodiments, if the hashes are calculated at 100 different locations, LUNs for which 80 hashes are identical are considered more similar than LUNs for which 70 hashes are identical.

Figure 8:
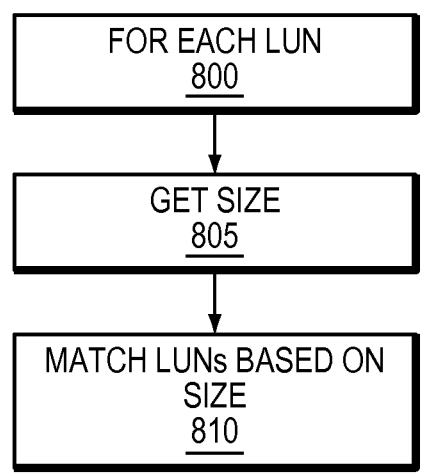
FIG. 8 is a simplified example of a method for matching LUNs based on LUN size, in accordance with an embodiment of the present disclosure.

Refer now to the example embodiments of FIGS. 4 and 8. In these embodiments, for each LUN of LUNs 435 on production site 430 (step 800), the size of the LUN is read (step 805). For each LUN of LUNs 460 on replication site 455 (step 800), the size of the LUN is read (step 805). LUNs 435 on production site 430 are matched to LUNs 460 on replication site 455 based on which LUNs have the same size, for example as illustrated in the example embodiment of FIG. 3 (step 810).

Figure 9:
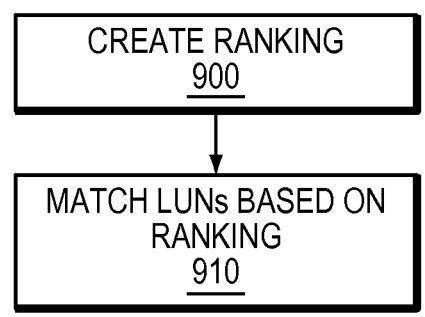
FIG. 9 is a simplified example of a method for creating a ranking for matching LUNs, in accordance with an embodiment of the present disclosure.

Refer now to the example embodiment of FIG. 9. In this embodiment, a ranking is created (step 900). In certain embodiments, the ranking may combine the similarity of the LUNs based on signatures and the size of the LUN to determine a similarity measure. Based on the ranking, the LUNs on a production site may be matched to LUNs on a replication site (step 910).

In another embodiment, the map of thin locations may be read for each LUN (i.e. the map of the locations which are not yet allocated in the LUN) in the case the LUN is thin, the map may be read by get LBA status SCSI command, a command which is part of the SCSI standard allowing to read the list of ranges of a LUN with indication if the ranges are allocated or not allocated.

In one embodiment, the locations of the unallocated data may be matched and LUNs may be marked as similar if most of the locations where the LUNs are thin are identical. In a second embodiment, the total amount of thin extents may be used for comparing the similarity.

Figure 10:
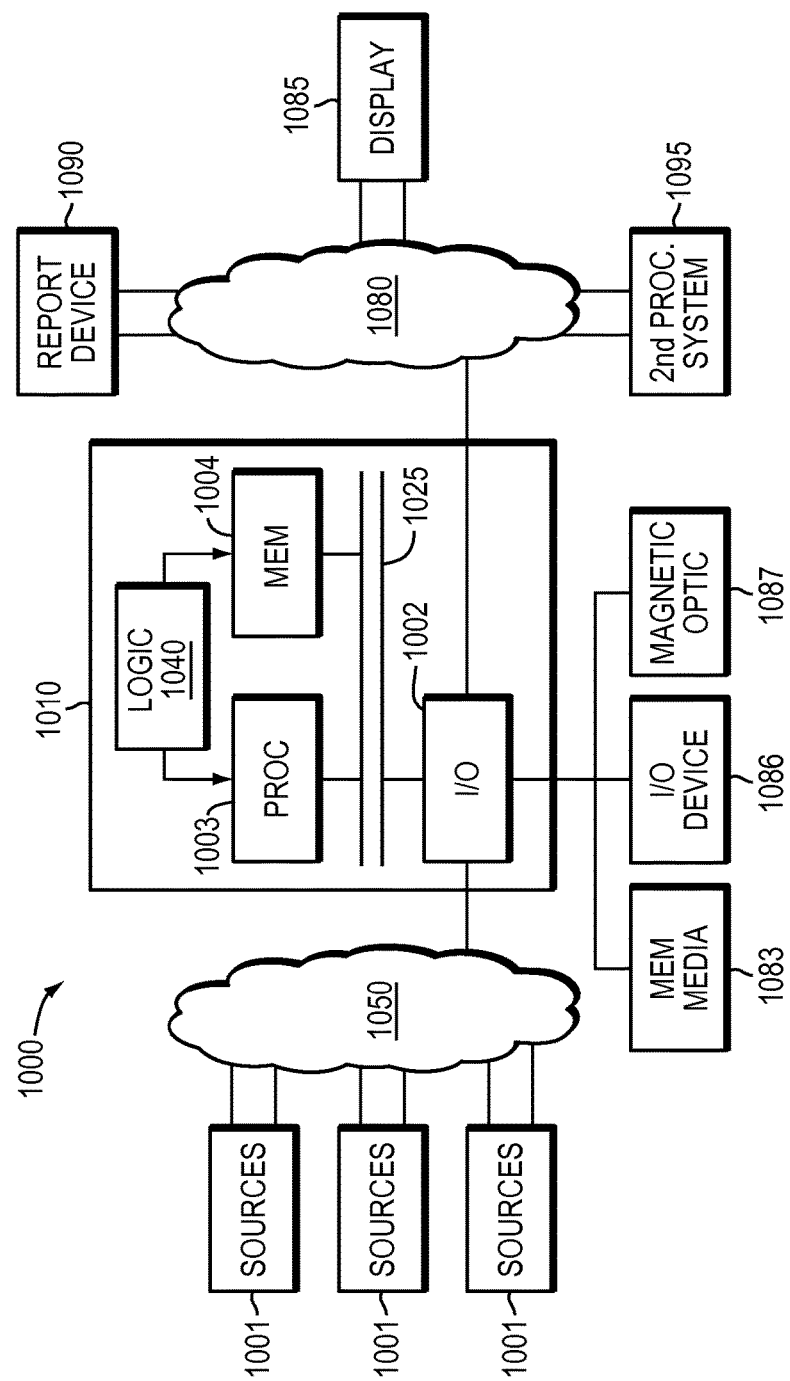
FIG. 10 is an example of an embodiment of an apparatus that may utilize the techniques described herein, in accordance with an embodiment of the present disclosure.
Figure 11:
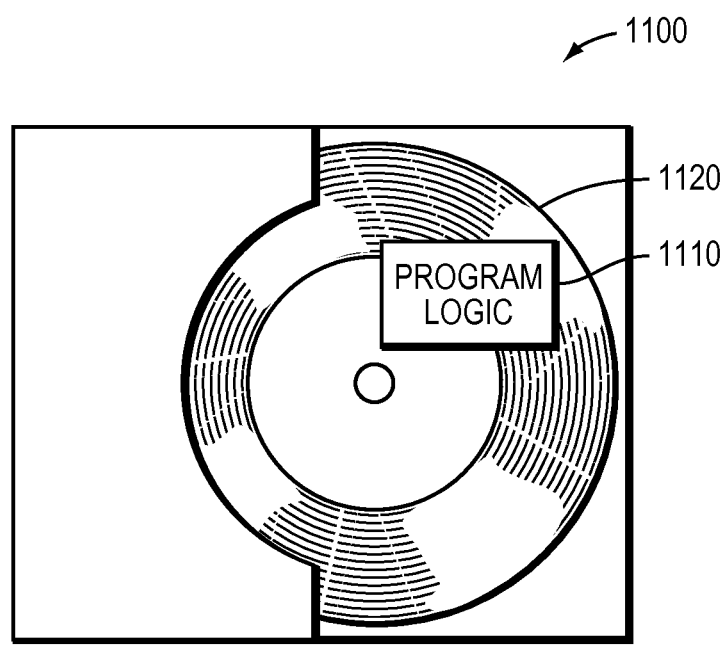
FIG. 11 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1110 embodied on a computer-readable medium 1120 as shown, and wherein the Logic is encoded in computer-executable code configured for carrying out the reservation service process of this invention and thereby forming a Computer Program Product 1100. The logic 1110 may be the same logic 1040 on memory 1004 loaded on processor 1003. The program logic may also be embodied in software modules, as modules, or as hardware modules.

The logic for carrying out the method may be embodied as part of the system described below, which is useful for carrying out a method described with reference to embodiments shown in, for example, FIGS. 7-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
a production site having a set of LUNs (Logical Unit);
a replication site having a set of LUNs; and
non-transitory computer-executable program logic operating in memory, wherein the non-transitory computer-executable program logic is configured to enable a computer to execute:
calculating a set of signatures for each LUN of the set of LUNs on the production site;
calculating a set of signatures for each LUN of the set of LUNs on the replication site;
comparing each set of the set of signatures for each LUN of the replication site to each set of the set of signatures for each LUN of the production site to determine a mapping for each respective LUN of the set of LUNs on the production site to a respective LUN of the set of LUNs on the replication site; wherein the mapping is determined by creating a ranking to determine a similarity measure, based on signatures and size of the LUN, wherein the similarity measure is based at least in part on which signature of the set of signatures for the production site is most similar to which signature of the set of signatures for the replication site; and
automatically matching a LUN of the set of LUNs on the production site to a replication LUN of the set of LUNs on the replication site based on the mapping to enable replication of the LUN on the production site to the matched LUN on the replication site.

2. The system of claim 1 wherein the matching is based on the set of signatures calculated for each of LUNs on the production site and the set of signatures of the signatures calculated for each of the LUNs on the replication site.

3. The system of claim 1 wherein the matching is based on the size of each LUN of the production site and the size of each LUN on the replication site.

4. The system of claim 1 wherein the matching is based on an algorithm; wherein the algorithm is based on the size of the LUNs and the similarity of the signatures of the LUNs.

5. The system of claim 1 wherein the matching is based on an algorithm, wherein the algorithm is based on the locations on the LUN which are unallocated.

6. The system of claim 1 wherein the signatures are calculated on a set of predetermined locations in the LUN.

7. The system of claim 1 wherein the signatures are calculated on a set of randomly chosen locations in the LUN, selected at the beginning of an algorithm.

8. A computer implemented method for data replication, the method comprising:
executing, by a computer, non-transitory computer-executable program logic operating in memory, wherein the non-transitory computer-executable program logic is configured to enable the steps of:
calculating a set of signatures for each of a set of LUNs (Logical Unit) on a production site;
calculating a set of signatures for each of a set of LUNs on a replication site;
comparing each set of the set of signatures for each LUN of the replication site to each set of the set of signatures for each LUN of the production site to determine a mapping for each respective LUN of the set of LUNs on the production site to a respective LUN of the set of LUNs on the replication site; wherein the mapping is determined by creating a ranking to determine a similarity measure, based on signatures and size of the LUN, wherein the similarity measure is based at least in part on which signature of the set of signatures for the production site is most similar to which signature of the set of signatures for the replication site; and automatically matching a LUN of the set of LUNs on the production site to a replication LUN of the set of LUNs on the replication site based on the mapping to enable replication of the LUN on the production site to the matched LUN on the replication site.

9. The method of claim 8 wherein the matching is based on the set of signatures calculated for each of LUNs on the production site and the set of signatures of the signatures calculated for each of the LUNs on the replication site.

10. The method of claim 8 wherein the matching is based on the size of each LUN of the production site and the size of each LUN on the replication site.

11. The method of claim 8 wherein the matching is based on an algorithm; wherein the algorithm is based on the size of the LUNs and the similarity of the signatures of the LUNs.

12. The method of claim 8 wherein the matching is based on an algorithm, wherein the algorithm is based on the locations on the LUN which are unallocated.

13. The method of claim 8 wherein the signatures are calculated on a set of predetermined locations in the LUN.

14. The method of claim 8 wherein the signatures are calculated on a set of randomly chosen locations in the LUN, selected at the beginning of an algorithm.

15. A computer program product comprising:
a non-transitory computer readable medium encoded with computer executable program code; the code enabling one or more processor to execute:
calculating a set of signatures for each of a set of LUNs on a production site;
calculating a set of signatures for each of a set of LUNs on a replication site;
comparing each set of the set of signatures for the each LUN of replication site to each set of the set of signatures for each LUN of the production site to determine a mapping for each respective LUN of the set of LUNs on the production site to a respective LUN of the set of LUNs on the replication site; wherein the mapping is determined by creating a ranking to determine a similarity measure, based on signatures and size of the LUN, wherein the similarity measure is based at least in part on which signature of the set of signatures for the production site is most similar to which signature of the set of signatures for the replication site; and automatically matching a LUN of the set of LUNs on the production site to a replication LUN of the set of LUNs on the replication site based on the mapping to enable replication of the LUN on the production site to the matched LUN on the replication site.

16. The computer program product of claim 15 wherein the matching is based on the set of signatures calculated for each of LUNs on the production site and the set of signatures of the signatures calculated for each of the LUNs on the replication site.

17. The computer program product of claim 15 wherein the matching is based on the size of each LUN of the production site and the size of each LUN on the replication site.

18. The computer program product of claim 15 wherein the matching is based on an algorithm; wherein the algorithm is based on the size of the LUNs and the similarity of the signatures of the LUNs.

19. The computer program product of claim 15 wherein the matching is based on an algorithm, wherein the algorithm is based on the locations on the LUN which are unallocated.

20. The computer program product of claim 15 wherein the signatures are calculated on a set of predetermined locations in the LUN.

* * * * *